March 16, 1965 J. SELIBER 3,173,311
AUTOMATIC TRANSMISSION MECHANISM
Filed March 28, 1962 2 Sheets-Sheet 1
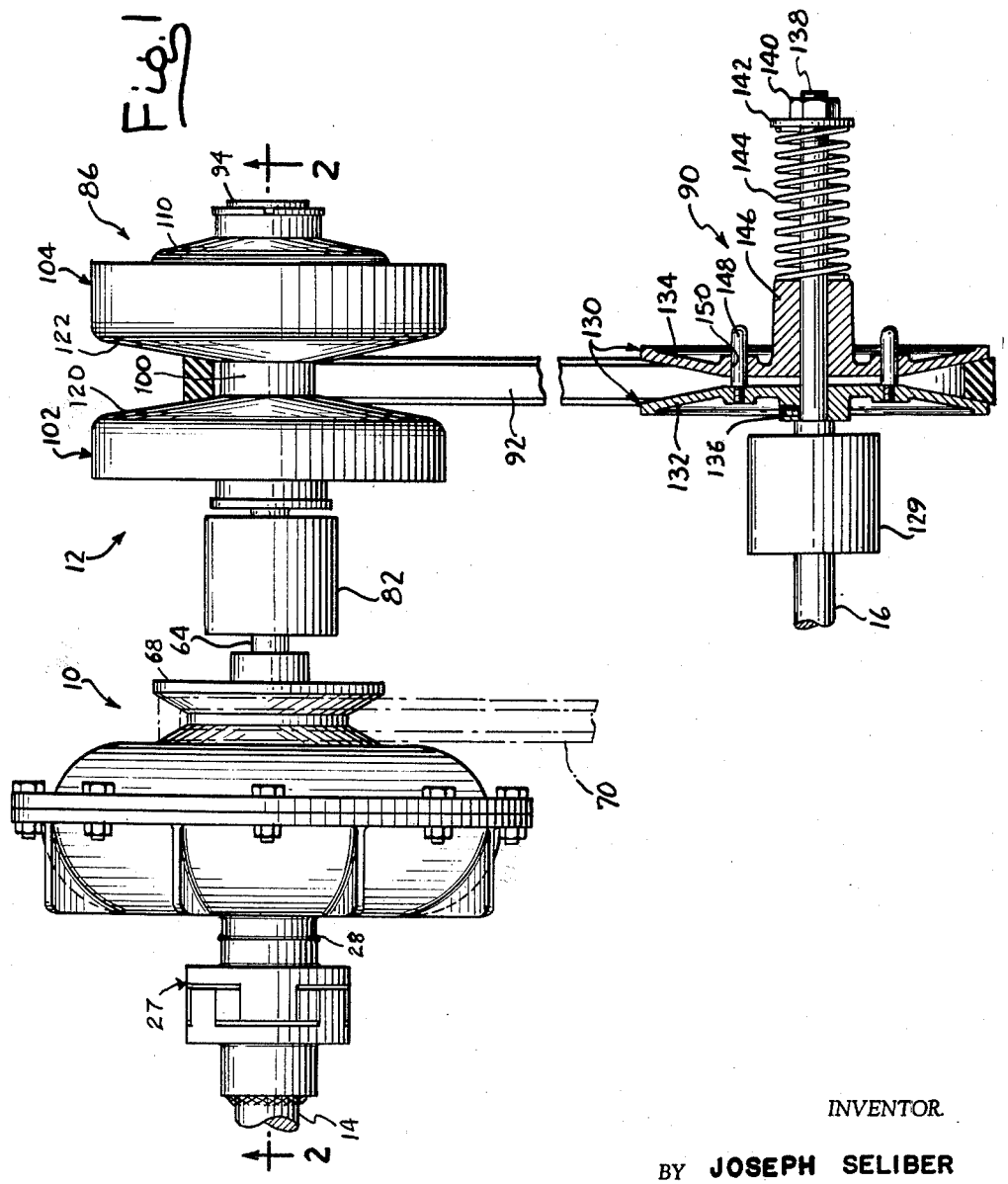
INVENTOR.
BY JOSEPH SELIBER
Edward R. Saunders March 16, 1965  J. SELIBER  3,173,311
AUTOMATIC TRANSMISSION MECHANISM
Filed March 28, 1962  2 Sheets-Sheet 2
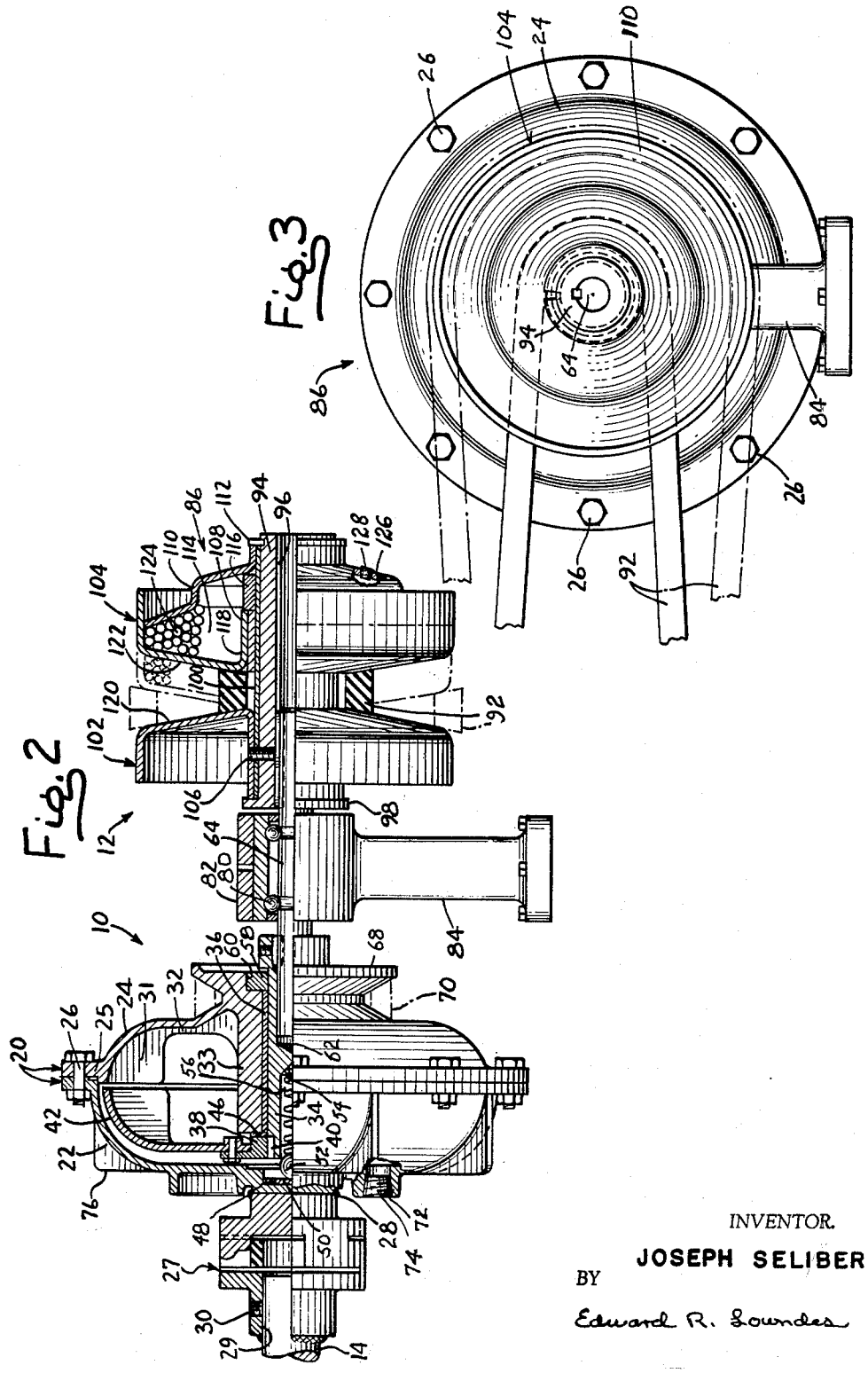
INVENTOR.
JOSEPH SELIBER
BY
Edward R. Lowndes

United States Patent Office 3,173,311
Patented Mar. 16, 1965

3,173,311
AUTOMATIC TRANSMISSION MECHANISM
Joseph Seliber, 313 Hibbard Road, Wilmette, Ill.
Filed Mar. 28, 1962, Ser. No. 183,132
2 Claims. (Cl. 74—731)

The present invention relates to transmission mechanisms and has particular reference to a novel power transmission device embodying an hydraulic power transmission coupling assembly and a centrifugally operable speed change assembly, the two assemblies being so related, each to the other, that, in combination, they produce a composite power transmission mechanism capable of variably transmitting power from a rotary drive shaft to a rotary driven shaft and, in so doing, exhibiting torque conversion characteristics unattainable by either assembly alone, or hitherto unattainable by known hydraulic or mechanical power transmission devices, whether used singly or in combination.

A power transmission constructed according to the principles of the present invention is capable of a wide variety of uses. For example, in the automotive field it may find use as a semi-automatic or a fully automatic transmission for establishing an infinite number of speed ratio changes in either an upshift or a downshift direction between an idling ratio wherein the output shaft of the transmission is motionless and a cruising speed ratio which may be substantially a one-to-one direct drive speed ratio, or which, if desired, may be in the nature of an overdrive wherein the speed of rotation of the output shaft is greater than the speed of rotation of the input shaft. In the industrial field, the present transmission mechanism will find uses too numerous to mention and, exemplary of such uses are as a power transmission for so-called pallet or fork lift trucks where the weight of the successive loads to be lifted varies widely; as a transmission for winding machines where the power at the output must be maintained substantially constant despite the gradual increase in winding diameter for any given material undergoing winding; or as a transmission for supplying the necessary power to effect the operation of a crane or overhead hoisting mechanism, or to effect the jaw-closing and jaw-opening movements of various forms of object-gripping clamping devices such as lifters associated with such overhead hoisting mechanisms, for example, sheet or coil lifters where it is necessary that the jaws be capable of high speed idling movement with an abrupt load increase as the material being handled is engaged, and terminating in high gripping force after the load has been fully engaged and compressed between the jaws. The present invention is also useful in the construction field where it may be put to use in connection with various forms of earth moving machinery such as bulldozers, snowplows, scrapers, dump trucks and the like where the load varies widely and is susceptible to such sudden changes that automatic torque conversion is imperative since the operator cannot be relied upon to anticipate such changes. By the same token, the invention may also be found applicable in connection with the logging industry for the operation of hoisting equipment, as well as treatment mechanism such as veneer lathes and the like.

In the field of agriculture, the present transmission mechanism may, by suitable modification if desired, be adapted for use in the propulsion of farm tractors and all manner of farm machinery, as well as in the operation of any power take-off devices associated with such tractors or machinery, or in the functional operation of such machinery. The present transmission mechanism may also find application in either marine use for the operation of winches, hoists and the like, or it may have limited application in aircraft use. Irrespective however of the particular use to which the present invention may be put, the essential features thereof are at all times preserved.

The disadvantage of establishing a direct drive between a power or drive shaft and a driven shaft, in most of the applications mentioned above, has long been recognized inasmuch as such a direct drive would place an insurmountable strain upon the drive shaft in starting from a position of rest. Thus, means under the control of the speed of operation of the drive shaft have been developed to provide a delayed transmission of power to the driven shaft so that the latter will be gradually and automatically accelerated in accordance with the capabilities of the drive shaft. These means have been varied and they have included such mechanical devices as centrifugally operable variable pitch pulley mechanisms and such hydraulic devices as hydraulic torque converters, both types of device serving to maintain a torque ratio which is commensurate with the speed of the driving shaft.

Insofar as variable pitch pulley mechanisms are concerned, it is necessary in many instances to employ in combination therewith a centrifugal or other speed responsive clutch which becomes disengaged at low drive shaft speeds so that shock loads will not be transmitted to the driving shaft, and so that the drive shaft will not become stalled when the motion of the driven shaft is terminated. Such mechanical devices, whether used alone or in combination with a centrifugal clutch, are obviously unsuited for use in instances where it is necessary that a degree of torque be applied to the stalled driven shaft, as for example in connection with earth moving machinery or gripping devices as briefly outlined above. With certain types of earth moving machinery, a back slide will take place unless torque is maintained on the drive shaft at the time of driven shaft stall, whereas with gripping devices, the gripping jaws will lose their power at the time the clutch becomes disengaged. If no automatic clutch is provided, the resultant stalling of the drive shaft will cause engine failure in the case of an internal combustion engine, or overheating in the case of an electric motor drive.

Insofar as hydraulic means for effecting a delayed transmission of power are concerned, the more expensive multi-stage hydraulic torque converters are capable of fulfilling the varied requirements of the contemplated applications outlined above and for which the present invention is suitable. However, such hydraulic torque converters are possessed of certain limitations and, principal among these is the high cost of the units. Another limitation that is attendant upon the use of multi-stage hydraulic torque converters for transmission purposes is the relatively large size of the unit which is required for any given transmission of power.

Apart from these purely economic and physical limitations, an outstanding functional limitation exists in connection with conventional multi-stage torque converters, this being a rapid decline in torque multiplication ratio at critical regions along the speed ratio range. By way of explanation, as well as of definition, it is pointed out that torque multiplication ratio (hereinafter referred to simply as torque ratio) refers to the ratio of output torque to input torque, i.e. the ratio of torque available at the driven shaft to the torque available at the drive shaft. The term speed ratio refers to the ratio of output speed to input speed or, in other words, the ratio of the rate of rotation of the driven shaft to the rate of rotation of the drive shaft. Stall torque ratio obviously refers to the torque ratio which exists at the time reaction forces are, or countertorque is, applied to the driven shaft in a degree just sufficient to stall the latter. The term efficiency, as subsequently employed herein, refers to the ratio of the product of output speed and output torque to the product of input speed and input torque.

As to the above referred to rapid decline of torque ratio in connection with conventional hydraulic torque converters, and by way of example, if it is assumed that it requires six foot pounds of torque (applied to the driven shaft) to hold or maintain an object or load, as well as to move such object forwardly, a conventional hydraulic torque converter may have the ability to thus hold or maintain the object. In other words, assuming the driven shaft to be stalled and the drive shaft to be rotating at a given rated speed, say 1800 r.p.m., the conventional torque converter may thus develop the necessary six foot pounds of torque at the driven or output shaft to hold the load. In this condition an impasse is reached because, although the converter may be able to hold the load, it cannot impel it forwardly due to the aforementioned rapid decline in torque ratio in the very critical stall or starting up region of the speed ratio range. The performance of such a torque converter is such that immediately upon movement of the driven shaft from its position of stall, the speed ratio increases but, as the speed ratio increases, the torque ratio rapidly decreases and consequently there is insufficient torque at the output shaft to move the load. Stated broadly, in this critical starting range of the converter, the latter is unable to maintain a sufficiently high level of torque ratio to perform the services required of it.

Another functional limitation that is present in connection with multi-stage hydraulic torque converters is their comparatively low efficiency when considered from the standpoint of power output. For instance, if in the example given above, it is assumed that the hydraulic torque converter does have the ability both to hold the load and to impel it forwardly, in the higher torque ratio range of the converter the speed ratio is extremely low. If it requires five foot pounds of torque to move a given load and, as in the aforegiven example the converter is capable of developing a six foot pound stall torque ratio, the load can be impelled at only approximately a 10% speed ratio, this being due to the aforementioned rapid decline in torque ratio as the driven shaft gathers speed.

From the above discussion it will be apparent that in earth moving machinery, gripping devices and the like where a high degree of stall torque, as well as a high degree of impelling torque is required to maintain a desired gripping or impelling force respectively, not even the larger and more expensive hydraulic torque converters are capable of supplying this torque.

The present invention is designed to overcome the above-noted limitations that are attendant upon the construction and use of conventional automatic and semi-automatic transmissions. Toward this end, it contemplates the provision of an inexpensive automatic speed change mechanism which is versatile to the extent that it may, with or without suitable modification, be applied to any of the varied uses briefly outlined above, and which involves in its general organization a fluid coupling device and a centrifugally operable variable pitch device. The two devices are so constructed and disposed in series relationship between an input or drive shaft and an output or driven shaft that a higher torque ratio may be maintained throughout the entire speed range of which the mechanism is capable than the torque ratio which can be maintained by conventional multi-stage hydraulic torque converters. At the same time an appreciably higher degree of stall torque ratio is available than is available with such multi-stage hydraulic torque converters.

The fact that a high torque ratio is maintained at low speed ratios is particularly useful in connection with automotive applications and farm machinery applications, especially where the power source is an internal combustion engine, inasmuch as such high torque is required at starting up speeds. It also is useful in connection with earth moving, logging, and machinery employing power driven gripping jaws where cumulative applications of countertorque to the driven shaft bring the latter to a condition of stall and a final thrust is needed at the time of stall, together with maintenance of such thrust after the stall has taken place.

As briefly outlined above, the transmission mechanism of the present invention is comprised of a simple and inexpensive fluid coupling and an equally simple and inexpensive centrifugally operable variable pitch device arranged in series relationship with the fluid coupling preferably preceding the variable pitch device although, under certain circumstances it may be expedient to have the variable pitch device preceding the fluid coupling. The fluid coupling is in the form of a so-called fluid flywheel having a vaned impeller and a vaned runner or turbine. In the series combination of the fluid coupling and centrifugally operable variable pitch device, the fluid coupling has no torque conversion effect. It can neither increase nor diminish torque and its sole function in the combination is comparable to that of an automatic clutch, slipping as it does at idling or low driving speeds and transmitting power as driving shaft speed increases. The centrifugally operable variable speed device is preferably, but not necessarily, in the form of a pulley assembly, the effective diameter of which increases as driving shaft speed increases. The pulley device supplies the necessary torque conversion whereas the fluid coupling supplies the necessary slip clutch effect for diminishing shock and accommodating low driven shaft speeds while the drive shaft operates at higher or rated speeds. Further however, the combination produces a transmission mechanism which, performancewise, is not approximated by the cushioning and torque-transmitting effects of multi-stage torque converter units in that it is capable of delivering high torque at low and stall speeds of the driven shaft, and of maintaining a high torque level over a wider speed range than is possible with such multi-stage hydraulic units.

The provision of an automatic transmission mechanism possessing the characteristics briefly stated above, being among the principal and general objects of the invention, it is a further object to provide such a mechanism which not only is itself of a compact nature and which, considering its capacity, occupies a minimum of space, but which is capable of varied modes of application between a driving shaft and a driven shaft to the end that the shafts may be arranged in close proximity to each other, either in positions of end-to-end alignment or in positions of parallelism, with the transmission mechanism presenting no obstacle to such close positioning of the shafts.

Another object of the invention, in an automatic transmission of the type under consideration, is to provide means whereby the operating characteristics of the transmission may be varied within wide limits, either to effect the torque ratio throughout the entire range of operation of the transmission, or to affect the extent of such range, as for example, to vary the reaction force required to bring about a condition of driven shaft stall for a given operating speed of the driving shaft.

The provision of an automatic transmission mechanism which is comprised of a minimum number of relatively moving parts and which therefore is unlikely to get out of order; one which is rugged and durable and which therefore will withstand rough usage; one which is capable of ease of assembly and disassembly for purposes of inspection of parts, replacement thereof or repair; one which is smooth and silent in its operation; and one which, otherwise, is well adapted to perform the services required of it, are further desirable features which have been borne in mind in the production and development of the present invention.

Numerous other objects and advantages of the invention, not at this time enumerated, will become more readily apparent as the nature of the invention is better understood.

In the accompanying two sheets of drawings forming a part of this specification, one embodiment of the invention has been shown by way of illustration.

In these drawings:

FIG. 1 is a plan view, partly in section, of an automatic transmission mechanism constructed according to the principles of the present invention and showing in dotted lines an alternative driving arrangement therefor;

FIG. 2 is a side elevational view in quarter section taken substantially along the line 2—2 of FIG. 1; and FIG. 3 is an end elevational view of the structure shown in FIG. 2.

Referring now to the drawings in detail and in particular to FIG. 1, the improved transmission mechanism of the present invention is comprised of two principal components, namely a fluid coupling assembly 10 and a variable pitch pulley assembly 12, the two assemblies being operatively connected together in series relationship to establish a cushioned variable speed driving connection between a rotary driving shaft 14 and a rotary driven shaft 16. The driving shaft 14 may be driven from any suitable source of power (not shown) as for example an internal combustion engine when it is contemplated that the transmission shall be employed for automotive propulsion, or an electric motor when it is contemplated that the transmission shall be employed for operating such machinery as winding or reeling machines, lifters, gripping devices and the like. Irrespective however of the particular use to which the present invention may be put, or of the particular derivation of the source of power therefor, the essential features of the transmission and its mode of operation are not affected.

The fluid coupling assembly 10 involves in its general organization a casing 20 which is formed in two sections 22 and 24 respectively, the sections being generally cup-shaped in configuration and being provided with mating bolting flanges 25 at their peripheries and which are secured together by clamping bolt and nut assemblies 26. The drive shaft 14 is operatively connected to the casing 20 by means of a conventional flexible coupling 27 which is brazed as at 28 or otherwise secured to the casing 20. The coupling 27 is formed with a socket 29 therein into which one end of the drive shaft 14 extends and in which it is secured by means of a set screw 30. The casing 20 thus rotates in unison with the drive shaft and constitutes the pump or impeller of the fluid coupling. The section 24 is formed with the usual series of radially disposed impeller vanes 31 which are connected by narrow radial webs 32 to an elongated axially extending hub 33 which is integrally formed as part of the casing section 24.

The hub 33 extends forwardly within the casing 20 and terminates short of the casing section 22. A central axial shaft 34 projects through the hub 33 and a sleeve bearing 36 is interposed between the hub and shaft. A flanged hub 38 is pinned as at 40 to the forward end of the shaft 34, thus forming a part of the fluid coupling turbine or runner and serving to support the usual radially extending turbine vanes 42. A thrust washer 46 surrounds the shaft 34 and is interposed between the forward end of the latter and the rear end of the flanged hub 38.

The casing section 22 is formed with a central internal socket or recess 48 within which there is seated a hardened steel thrust plate 50. A ball 52 bears against the thrust plate 50 and a spring 54 has one end thereof bearing against the ball 52 and its other end bearing against the bottom wall of a relatively deep socket 56 formed in the forward end of the shaft 34. The spring 54 thus serves to normally urge the shaft 34 rearwardly and cause the washer 46 to be compressed between the flanged hub 38 and the hub 33. A conventional oil seal 58 is seated within an annular recess 60 provided in the rear end face of the hub 33.

The rear end of the shaft 34 is formed with a relatively deep socket 62 therein, in which socket there is received the forward end region of a connecting shaft 64. A set screw 66 serves to secure the shaft 64 in position within the socket 62. The connecting shaft 64 thus constitutes the output or driven shaft of the hydraulic coupling 10 and, as will be described in greater detail presently, it also constitutes the input or driving shaft of the variable pitch pulley assembly 12. The rear end region of the hub 33 is formed with an integral sheave or pulley section 68 by means of which input power may be applied to the impeller section of the fluid coupling, thus providing an alternative means for driving the impeller section. When the pulley section 68 is employed for power input purposes, it may be operatively connected to a V-belt such as the belt shown in dotted lines at 70 and the flexible coupling 27 may be left in position on the casing 20 or it may be removed if desired.

The casing section 22 is provided with a filling opening 72 through which oil may be introduced into the casing 20. The filling opening 72 is provided with a filler plug 74. A series of cooling vanes 76 are formed on the outside of the casing section 22 as is conventional with fluid couplings of the type under consideration.

Except for the provision of the alternative power input for the fluid coupling 10, this coupling operates in the usual and well known manner of fluid coupling operation. Briefly, the casing 20 is a sealed unit and is partially filled with oil. Rotation of the driving shaft 14, and consequently of the impeller casing 20, causes the oil within the casing 20 to be forced radially outward where it is effective against the impeller vanes 31 and turbine vanes 42 in such a manner that as the oil is carried around the torus which surrounds the hub 33, under the influence of the impeller vanes 31, it crosses over and strikes the turbine vanes 42 and causes the turbine as a whole to rotate in the same direction as the impeller casing 20. At high speeds, the fluid coupling is extremely efficient and the loss of speed between the two parts, i.e. the impeller and turbine, is on the order of 2%. At low speeds, there is considerable slippage and at idling speeds the slippage is substantially 100%. There is however under some conditions and at low speeds a small amount of energy transfer to the turbine and, when the transmission is employed for automotive purposes, this transferrence of energy will have a tendency to cause forward creeping of the vehicle. According to the present invention, and as will be made clear presently, the centrifugally operable variable pitch pulley assembly 12 establishes an appreciable speed ratio change between the output shaft 64 of the fluid coupling 10 and the driven shaft 16 so that this tendency for forward creeping is greatly diminished. The fluid coupling 10 of the present invention exhibits no torque conversion characteristics and its function in the present transmission is three-fold. First, it functions as a cushioning member to absorb shock loads; secondly, it functions as an automatic slip clutch device to allow for slippage at low speeds; and thirdly, it permits the application of torque to the driven shaft when a condition of stall takes place. When the fluid coupling 10 is operatively connected to the centrifugally operable variable pitch pulley assembly 12, according to the present invention, these three functions contribute toward the production of overall torque transmitting characteristics which have hitherto been unattainable in connection with prior fluid coupling use as will be made clear in detail subsequently.

Referring now to all views of the drawings, the connecting shaft 64 is rotatably journalled by means of antifriction bearings 80 in the upper enlarged sleeve portion 82 of a support of standard 84. When the transmission is employed for automotive use, the support 84 may constitute a stationary part of the vehicle framework or chassis, whereas for a stationary installation the support may be suitably mounted on a floor or other foundation surface. The rear end region of the connecting shaft 64 projects appreciably beyond the sleeve portion 82 and carries a driving pulley assembly 86 associated with the centrifugally operable variable pitch pulley device 12 and which will hereinafter be referred to as the driving section thereof. The pulley device 12 also has associated therewith a driven pulley assembly 90 which will hereinafter be referred to as the driven section. The two sections 86 and 90 are operatively connected together in driving relationship by an endless flexible V-belt 92.

Referring now specifically to FIG. 2, the driving pulley assembly 86 includes a tubular drive shaft or sleeve 94 which is keyed as at 96 to the connecting shaft 24 and which is provided with a radial end flange 98. A bearing sleeve 100 surrounds the drive shaft or sleeve 94 and carries thereon a split pulley arrangement including an axially fixed pulley section 102 and an axially slidable pulley section 104, the former being secured to the sleeve 94 by an anchoring screw 106 and bearing against the end flange 98. The pulley section 104 is provided with an internal liner 108 which is axially slidable on the bearing sleeve 100 so that the pulley section 104 is movable bodily as a whole toward and away from the fixed pulley section 102.

The movable pulley section 104 is of cup-shaped configuration and it has associated therewith a retaining shield 110 which is secured as at 112 to the sleeve 94 against axial shifting. The cup-shaped pulley section 104 is telescopically received over the peripheral regions of the retaining shield 110 so that upon sliding movement of the former relative to the latter, an internal variable displacement chamber 114 of generally torus-like design is formed within the pulley section 104, the chamber increasing in volume as the pulley section 104 moves toward the section 102. A stop ring 116 surrounds the bearing sleeve 100 and limits the extent of axial shifting movement of the pulley section 104 to the right as viewed in FIG. 2, this stop ring being disposed in the path of movement of a reentrant inturned hub flange 118 associated with the pulley section 104.

The pulley sections 102 and 104 are formed with opposed inclined friction surfaces 120 and 122 respectively, these surfaces being adapted to receive therebetween and to cooperate with the V-belt in driving relationship.

The chamber 114 is partially filled with a quantity of relatively small steel balls 124 which may be in the form of ordinary ball bearings and which, en masse, present a considerable mass of flowable material of high specific gravity within the chamber 114. This mass of heavy material is adapted to be acted upon by centrifugal forces during rotation of the pulley section and, by a spreading action which is proportional to the degree of the applied centrifugal forces, to force the pulley section 104 toward the fixed pulley section 102 to decrease the distance between the two sections and cause the V-belt 92 to ride radially outwardly on these two sections in a manner well known in the art in connection with Reeves and other similar types of variable pitch pulley devices. At relatively low speeds or at idling speeds, the pulley section 104 will assume the position wherein it is shown in full lines in FIG. 2 with the rim of the reentrant flange 118 bearing against the stop ring 116 and with the pulley section 104 in its fully retracted position so that the driving assembly 86 has an effective small driving diameter and the belt 92 rides between the pulley sections 102 and 104 on a relatively small driving radius. As the speed of the assembly 86 increases, the centrifugal forces acting upon the balls 124 causes the flowable ball mass to be forced radially outwardly with the result that the pulley section 104 is forced toward the pulley section 102 to decrease the distance between the two sections. In its extreme advanced or forward position, the pulley section 104 assumes the dotted line position shown in FIG. 2 wherein it is in close proximity to the pulley section 102 and the belt 92 rides on the two opposed inclined surfaces 120 and 122 near the outer peripheries thereof. With the various parts in this position, the driving assembly 86 has a relatively large effective diameter for driving purposes.

The shield 110 is provided with a filling opening 126 therein which is adapted to be closed by a filler plug 128. The opening is provided for the purpose of permitting introduction of predetermined quantities of the steel balls into the chamber 114 and of permitting removal of such quantities when desired to vary the operational characteristics of the transmission.

The driven shaft 16 is rotatably journalled in a support 129 and has mounted thereon a split reaction pulley 130 (FIG. 1) including an axially fixed pulley section 132 and an axially slidable pulley section 134, the former being pinned as at 136 to the shaft 16. The right hand end of the shaft 16 as viewed in FIG. 1 is threaded as at 138 and receives thereover a nut 140 and washer 142 while a compression spring 144 surrounds the shaft 16 and bears at one end against the washer and at its other end against the end of a hub portion 146 provided on the pulley section 132. The two split pulley assemblies, i.e. the driving section 86 and the driven section 90, are in approximate transverse alignment on their respective shafts 64 and 16 and the drive belt 92 passes over both pulley assemblies. The operative inside surfaces of the pulley flanges may be bevelled on an angle of approximately 11° and the edge regions of the V-belt may be correspondingly bevelled or tapered. Drive pins 148 secured to the pulley section 132 project through holes 150 in the pulley section 134 to insure rotation of the two pulley sections in unison.

The maximum and minimum effective diameters of the inside sloping surfaces of the pulley flanges and the continuous extent of the belt are such that the nut 140 may be adjusted so that the spring 144 exerts the proper degree of thrust upon the pulley section 134 whereby the sides of the belt are frictionally engaged by the sloping faces of the two pulley sections 132 and 134 with the necessary degree of frictional engagement that "opening" and "closing" movements of the two pulley assemblies 86 and 90 will take place in reverse relationship so that as the pulley section 104 is forcibly moved toward the pulley section 102 of the pulley assembly 86 to increase the effective diameter of the pulley assembly 90, the tension exerted by the belt 92 on the pulley assembly 90 will cause the pulley section 134 to be moved against the action of the spring 144 away from the pulley section 132 to decrease the effective diameter of the pulley assembly 90, all in the manner of conventional Reeves pulley mechanisms.

In the operation of the herein described variable speed transmission, speed change ratios which are within the range of which the transmission is capable are automatic, the fluid coupling 10 operating in the manner previously described so that at low rotative speeds of the driving shaft the degree of slip is appreciable and the transference of power which does take place between the drive shaft 14 and the connecting shaft 64 (which is the output shaft of the fluid coupling) will result in such slow rotation of the driving pulley assembly 86 of the centrifugally operable variable pitch device 12 that the speed ratio reduction through this device will be at a maximum, thereby resulting in a very slow rate of rotation of the driven shaft 16. Thus, when the transmission is put to automotive use for propulsion purposes, the tendency for forward creeping of the vehicle at low input speeds will be materially diminished. The torque level in this low speed range is however high and it remains high as the speed ratio increases, i.e. as the speed of the driven shaft increases, thus rendering the transmission useful in fields such as earth moving machinery and the like where it is necessary to maintain such high torque ratio in the low speed range. In the higher speed ranges, the present transmission will effectively perform its intended function since, as the speed of the driving shaft reaches a relatively high level, the speed ratio through the fluid coupling 10 levels off and approaches a direct one-to-one drive ratio, while the speed ratio through the variable pitch pulley assembly 12 likewise levels off and approaches such a direct drive ratio, this being due to the action of centrifugal force acting upon the steel balls 124 and causing the two pulley sections 102 and 104 to approach each other and increase the effective driving diameter of the pulley assembly 86. In this high speed range however, the transmission as a whole remains sensitive to slight variations in speed ratio and thus, when the transmission is put to such use as the operation of winding machines and the like, the constant incremental increase in drum or reel diameter which ordinarly has the effect of normally decreasing the torque applied to the winding drum, causes a corresponding incremental degree of counter-torque to be applied to the drum. This degree of counter-torque is not immediately sensed by the variable pitch pulley assembly 12 but is transmitted through the assembly to the fluid coupling and results in a degree of slippage between the impeller and turbine vanes so that the output shaft, i.e. the connector shaft 64, decreases its speed slightly. This decrease in speed is then reflected in the variable pitch pulley assembly by the operation of the driving pulley assembly 86, the decrease in rotative speed of which causes the steel balls 124 to lose a degree of their centrifugal force so that the tension of the belt 92 will effect a corresponding decrease in effective driving pulley diameter, thus increasing the torque output of the transmission as a whole.

It is deemed unnecesary to set forth the mode of operation of the transmission assembly for additional environments thereof, it being sufficient to state that, generally speaking, variations in load at the output shaft 16 are first transmitted through the variable pitch pulley assembly 12 to the fluid coupling 10 and the consequent change of operating in this fluid coupling is then effective to modify the operation of the variable pitch pulley assembly. At any given rotative speeds of the drive shaft and driven shaft respectively, and at any given output load, the two principal assemblies 10 and 12 may be said to be in a condition of equilibrium, this condition remaining effective until there is a change in input speed or output load.

The invention is not to be limited to the exact arrangement of parts herein described or shown in the accompanying drawings as various changes in the details of construction may be resorted to without departing from the spirit of the invention. For example, in the exemplary form of the invention shown and described herein, the fluid coupling 10 precedes the variable pitch device in the series relationship in which they are coupled. It is however within the purview of the invention that the variable pitch device shall precede the fluid coupling in the series relationship. Still further, it is contemplated that the fluid coupling and variable pitch device may assume forms other than those disclosed herein. For example, this coupling may be of the viscous shear type or it may assume the form of an electromagnetic or eddy current coupling if desired. These and various other forms of slip devices are capable of use to satisfy the requirements of certain installations. Additionally, other forms of variable pitch devices than the one illustrated and described herein may be employed if desired. A wide variety of Reeves type mechanisms are available for use whether the output section thereof is spring loaded as shown herein or whether it be provided with other means for eliminating belt slack. Therefore, only insofar as the invention has particularly been pointed out in the accompanying claims is the same to be limited.

Having thus described the invention, what I claim and desire to secure by Letters Patent is:

1. An automatic transmission mechanism for establishing a driving connection between a driving shaft and a driven shaft arranged in parallelism, said mechanism comprising, in combination with said shafts, a fluid composite coupling including an annular rotatable casing operatively connected to the driving shaft in driven relationship and constituting the driving element of the fluid coupling, and a turbine disposed within said casing and constituting the driven element of the fluid coupling, a composite centrifugally operable variable speed change device including a drive sleeve coaxial with the driving and driven elements of the fluid coupling, a connecting shaft extending coaxially between the driven element of the fluid coupling and the drive sleeve and projecting through the latter, a fixed bearing support for said connecting shaft disposed between the fluid coupling and the speed change device, through which the connecting shaft projects, and in which it is rotatably journalled, means fixedly securing the connecting shaft to the driven element of the fluid coupling in driving relationship, means establishing a splined driving connection between the connecting shaft and the drive sleeve, said speed change device further including a split pulley on said drive sleeve and having a pair of pulley sections relatively movable toward and away from each other, said pulley sections defining therebetween a V-groove of variable width for reception therein of a V-belt whereby the effective diameter of the pulley is a function of the groove width, means connecting at least one of said pulley sections and drive sleeve for rotation in unison, centrifugally operable means responsive to increasing and decreasing increments of speed of said drive sleeve for causing relative movement of the pulley sections toward and away from each other respectively to decerase and increase the V-groove width respectively, a compensating split pulley on said driven shaft, and a V-belt operatively connecting the two split pulleys in driving relationship, said bearing support constituting the sole supporting means for said fluid coupling, the connecting shaft and the speed change device exclusive of the compensating split pulley and adjacent portions of the V-belt.

2. An automatic transmission mechanism for establishing a driving connection between a driving shaft and a driven shaft arranged in parallelism, said mechanism comprising, in combination with said shafts, a composite fluid coupling including an annular rotatable casing operatively connected to the driving shaft in driven relationship and constituting the driving element of the fluid coupling, and a turbine disposed within said casing and constituting the driven element of the fluid coupling, said casing being formed with an internal reentrant hub, a central axial shaft projecting through said hub and operatively connected to the turbine in driven relationship, the rear end of said central axial shaft being formed with a socket therein, a composite centrifugally operable variable speed change device spaced axially and rearwardly from the composite fluid coupling and including a drive sleeve coaxial with the driving and driven elements of the fluid coupling, a connecting shaft having its forward end secured in said socket and projecting rearwardly through said drive sleeve, a fixed bearing support for said connecting shaft and disposed between the fluid coupling and the speed change device, said connecting shaft projecting through said bearing support and being rotatable therein, means establishing a spline connection between the rear end region of the connecting shaft and said drive sleeve for imparting rotation movement to the latter from the former, said speed change device further including a split pulley on said drive sleeve, said split pulley including an axially fixed pulley section and an axially shiftable pulley section movable toward and away from the axially fixed pulley section, said pulley sections defining therebetween a V-groove of variable width for reception therein of a V-belt whereby the effective diameter of the pulley is a function of the groove width, means establishing a driving connection between the drive sleeve and the axially fixed pulley section, centrifugally operable means responsive to increasing and decreasing increments of speed of said drive sleeve for causing movement of the axially shiftable pulley section toward and away from the axially fixed pulley section to decrease and increase the V-groove width respectively, a compensating split pulley arrangement on said driven shaft, and a V-belt operatively connecting the split pulley to the split pulley arrangement in driving relationship, said bearing support constituting the sole supporting means for said fluid coupling, the connecting shaft and the speed change device exclusive of the split pulley arrangement and adjacent portions of the V-belt.

References Cited by the Examiner

UNITED STATES PATENTS

| | | |
|---|---|---|
| 2,802,367 | 8/57 | Hoover et al. |
| 2,918,824 | 12/59 | Rabe. |
| 2,940,329 | 6/60 | White. |
| 3,006,206 | 10/61 | Kelley et al. _____ 74—190.5 |

FOREIGN PATENTS

| | | |
|---|---|---|
| 1,169,339 | 12/58 | France. |
| 508,750 | 7/39 | Great Britain. |
| 505,785 | 12/54 | Italy. |

DON A. WAITE, *Primary Examiner.*